Feb. 12, 1957  H. J. HEPP ET AL  2,781,409
CATALYTIC ALKYLATION OF HYDROCARBONS IN THE
PRESENCE OF ACETYLENE AND HYDROGEN
Filed March 26, 1952

INVENTORS.
H. J. HEPP
F. E. FREY
BY
Hudson + Young
ATTORNEYS

United States Patent Office 2,781,409
Patented Feb. 12, 1957

2,781,409

CATALYTIC ALKYLATION OF HYDROCARBONS IN THE PRESENCE OF ACETYLENE AND HYDROGEN

Harold J. Hepp and Frederick E. Frey, Bartlesville, Okla., assignors to Phillips Petroleum Company, a corporation of Delaware Application March 26, 1952, Serial No. 278,566

11 Claims. (Cl. 260—683.4)

This invention relates to the alkylation of hydrocarbons, for example the alkylation of an isoparaffin with an olefin. In one of its aspects the invention relates to the alkylation of a low-boiling isoparaffin, for example, isobutane, with an olefin, for example, ethylene, in the presence of an aluminum halide-catalyst, in a mixed-phase operation in which both liquid and gaseous reactants are present, in a manner according to a concept as a result of the application of which product yield is improved, catalyst deterioration is substantially avoided, thus increasing catalyst life, and equipment and operational steps are greatly reduced all as appears from this disclosure. In another of its aspects the invention relates to and is intimately concerned with the optimum production of alkylating olefin, for example, ethylene, coupled with the effective and economic use of said olefin for the production of high antiknock fuel or fuel components. In still another of its aspects the present invention is concerned with a process for the alkylation of isobutane with ethylene in the presence of an aluminum chloride catalyst the ethylene being contained in a cracked gaseous effluent, resulting from a relatively high temperature and high per pass conversion cracking operation, and being used directly without any intervening or intermediate treatment or purification step despite the fact that such a gas has been found to contain proportions of acetylene, and other like objectionable gases, which, within the concept of the present invention, would have been considered non-tolerable because said proportions of said acetylene would have been thought to render the process extremely expensive and involved to operate or to be unworkable. In still another of its aspects the present invention relates to the production of diisopropyl (2,3-dimethylbutane) from isobutane and ethylene contained in a cracked gaseous effluent, as described, in the presence of an aluminum chloride catalyst according to a concept the application of which results in a much cheaper apparatus, fewer operational steps, higher yields of 2,3-dimethylbutane and an unexpected long life, and therefore lower cost, for the catalyst. Another aspect, still, of the present invention is that it is concerned with the provision of a novel, desirable olefin-containing alkylating stream of gaseous materials, the said novel stream when it had been obtained, according to the invention, had it been considered from a prior art viewpoint, that is, without the benefit of the further concepts of this invention, it would have been judged to be wholly unsuited for use in the production of isoparaffin-olefin alkylate, in the presence of an aluminum halide catalyst, because it would have been found then to contain a larger or nontolerable proportion of acetylene. In still another of its aspects, the present invention is concerned with and relates to a mixed-phase alkylation operation, that is, an operation in which the reactants are not wholly in the liquid phase, indeed, an operation in which a substantial proportion of the reactants is wholly in the vapor or gas phase, which, judged from a prior art viewpoint, is not an advantageous manner in which to conduct such an alkylation but which according to a concept of this invention is a suitable manner in which to operate.

In the art it is known to alkylate an isoparaffin with an olefin in the presence of an aluminum halide catalyst which can be an aluminum chloride-hydrocarbon complex and which can be activated with a hydrogen halide, for example, hydrogen chloride. Thus, isobutane has been alkylated with ethylene in the presence of an aluminum chloride catalyst to produce diisopropyl which is 2,3-dimethylbutane and is to be distinguished from neohexane which is 2,2-dimethylbutane, which latter alkylate has been produced at very high temperatures and very high pressures of the order of 900–1100° F. and 1000 to 10,000 pounds per square inch, respectively. It is known that supercharged engines require the very best fuels possible to produce and under some conditions of use, for example, in U. S. Army aviation gasolines, the isoparaffinic materials present must contribute to the antiknock qualities of the fuel because it must have only a limited amount of aromatics therein. It is also known that the 3–C rating of 2,3-dimethylbutane (diisopropyl) is considerably greater than that of 2,2-dimethylbutane (neohexane). Therefore, the art tends to produce diisopropyl which has become and continues to be increasingly important in the production of fuels for the higher and higher compression engines which are being turned out for both aviation and automotive applications.

Prior art processes for the manufacture of diisopropyl from isobutane and ethylene have utilized, as a source of ethylene, cracked gas streams containing little or no acetylene. Such streams were obtained under cracking conditions, especially temperature and per-pass conversion, such that the formation of acetylene was negligible. Thus, the prior art temperature for the production from naphtha of ethylene feed stock for the diisopropyl-forming reaction has been in the range of from about 1200° F. to 1400° F. At these temperatures, whatever the charging stock used, there will be formed practically no acetylene as is indicated by the following table.

TABLE I

*Acetylene increase with increase of temperature when cracking ethane to ethylene in the region of 90% of equilibrium ethane conversion*

| Temperature, ° F | 1,400 | 1,500 | 1,600 | 1,600 | 1,700 | 1,800 | 1,900 | 2,500 |
|---|---|---|---|---|---|---|---|---|
| Acetylene in cracked gas, mol. percent | ¹0.04 | ¹0.15 | ¹0.5 | 0.6 | 1.3 | 2.7 | 3.2 | 3.9 |
| Acetylene in acetylene-ethylene cut, percent | | | | 1.7 | 3.7 | 7.2 | 8.1 | 11 |
| Acetylene yield, mols/100 mols | | | | | 2.8 | 5.8 | 6.7 | 10 |

¹ Calculated by method given in Ind. Eng. Chem. 41, 2531 (1949), assuming cracking carried to 100% of equilibrium.

The concentration of ethylene in the cracked gas increased with increased ethane cracking to a maximum value of 37 volume percent at 1800° F. and 83 percent destruction of ethane.

Furthermore, generally, the prior art has not been concerned with the problem with which the present invention is concerned and which the present invention solves, namely, the presence of acetylene in more than tolerable or insignificant proportions, and it appears that in the catalytic production of diisopropyl whatever acetylene has been present in the ethylene gas used has not had any great effect upon the catalyst, i. e., upon its viscosity or activity. This, it should be noted is in connection with an ethylene stream prepared by cracking ethane and/or propane at a temperature in the range 1250–1450° F.

It has now been found that for the production of ethylene, from ethane for the diisopropyl-forming reaction, in amounts sufficient to enable a truly economic and readily operable operation, temperatures in the range of 1475–1900° F. at a pressure of near atmospheric are required. When ethane is so cracked to produce the ethylene, per pass conversions of 60–95 percent are accomplished. It is especially important that it has been noted that at the higher temperatures, within the said range, the ethylene yield is larger since it has been further noted that the cracking rate increases much faster than does the rate of polymerization and that the equilibrium is more favorable; concomitantly, hydrogen yield is also increased. Still further it has been found that the ethylene-containing gas thus produced at said temperatures can be used directly in the presence of an aluminum chloride catalyst, under the usual diisopropyl-forming conditions, to alkylate isobutane to produce high yields of diisopropyl with a greatly reduced equipment and operational steps and, equally importantly, without the heretofore expected catalyst deterioration because the gas thus produced contains a substantial proportion of hydrogen.

In the following table there are presented data on the effect of acetylene, and of hydrogen, on the catalyst life.

pound of $AlCl_3$. Hydrogen increases catalyst life as can be seen by inspection of the data in the table. With 0.13 weight percent acetylene present in the feed, 0.28 weight percent hydrogen increased the catalyst life to give 14.2 gallons alkylate per lb. $AlCl_3$. Without hydrogen the yield of alkylate would be considerably lower, since 0.05 weight percent acetylene and no hydrogen gave a yield of alkylate of only 11.6 gallons per pound of $AlCl_3$. It is also to be noted that ethylene conversion was also increased by using hydrogen in the feed.

From Tables I and III it can be noted that the presence of acetylene very materially adversely affects the yield of alkylate per pound of catalyst, and that the proportion acetylene produced even at a temperature as low as 1400° F., i. e., 0.04 weight percent, is in effect a non-tolerable proportion of said gas and that in the presence of hydrogen the said yield is restored.

Therefore according to this invention the art has been provided with a process for the production of diisopropyl from isobutane and ethylene, the process being based upon the concurrent concepts that (1) the large or non-tolerable proportions of acetylene present in an otherwise desirable cracked effluent containing ethylene need not be removed, (2) at the higher temperatures at which

TABLE II

*Effect of acetylene and of hydrogen on DIP catalyst life*

| Run No. | 1 | 1 | 1 | 1 | 2 | 2 | 3 | 4 | 5 |
|---|---|---|---|---|---|---|---|---|---|
| Period | a | b | c | d | a | b | a | a | a |
| Furnace effluent, mol percent: | | | | | | | | | |
| Hydrogen | | | | | 32.2 | 32.7 | 23.7 | | |
| Methane | | | | | 37.9 | 38.4 | 24.8 | | |
| Acetylene | | | | | 0.133 | .133 | .86 | | |
| Ethylene | | | | | 18.467 | 17.467 | 50.64 | | |
| Propylene | | | | | 11.3 | 11.3 | | | |
| Reactor feed, mol percent: | | | | | | | | | |
| Hydrogen | | | | | 13.1 | 13.3 | 6.6 | | |
| Methane | | | | | 15.4 | 15.6 | 6.9 | | |
| Acetylene | | | | | 0.054 | .054 | .24 | | |
| Ethylene | | | | | 7.5 | 7.1 | 14.06 | | |
| Propylene | | | | | 4.6 | 4.6 | | | |
| Isobutane | | | | | 59.3 | 59.3 | 70.8 | | |
| n-Butane | | | | | | | 1.4 | | |
| Reactor feed, wt. percent: | | | | | | | | | |
| Hydrogen | 0.0 | 0.0 | 0.0 | 0.0 | .64 | .65 | .28 | .26 | .45 |
| Methane | | | | | 6.00 | 6.08 | 2.34 | | |
| Acetylene | 0.0 | 0.05 | 0.08 | 0.30 | 0.03 | 0.03 | .13 | .22 | .45 |
| Ethylene | 10.4 | 10.6 | 9.0 | 10.2 | 5.14 | 4.86 | 8.32 | 11.4 | 11.7 |
| Propylene | | | | | 4.68 | 4.66 | | | |
| Isobutane | 88.2 | 87.7 | 88.6 | 88.4 | 82.05 | 82.26 | 87.29 | 87.5 | 87.4 |
| n-Butane | 1.4 | 1.7 | 2.3 | 1.1 | 1.43 | 1.43 | 1.60 | 1.6 | |
| Isoparaffin/olefin mol ratio | 4.09 | 3.99 | 4.75 | 4.18 | 4.80 | 4.98 | 5.06 | 3.7 | 3.78 |
| Reactor, ° F. | 110 | 110 | 110 | 110 | 110 | 112 | 110 | 110 | 110 |
| Reactor, p. s. i. g. | 300 | 300 | 305 | 300 | 355 | 350 | 350 | 350 | 495 |
| Contact, min. | .25 | 23 | 25 | 31 | 2.1 | 2.2 | 8.5 | 11.5 | 12.0 |
| Feed/catalyst | 1.25 | 1.30 | 1.35 | 1.83 | .22 | .22 | 0.4 | 0.64 | 0.76 |
| Effluent composition, wt. percent: | | | | | | | | | |
| Hydrogen | | | | | | | .3 | .28 | .45 |
| Methane | | | | | | | 2.5 | | |
| Acetylene | | | | | | | | | .03 |
| Ethylene | 0.0 | .5 | .7 | 3.0 | .57 | .82 | .2 | .3 | 1.00 |
| Propylene | | | | | 0.0 | 0.0 | | | |
| Isobutane | 66.1 | 69.5 | 74.0 | 78.3 | 67.14 | 68.32 | 72.6 | 67.0 | 69.4 |
| n-Butane | 1.4 | 1.7 | 2.3 | 1.1 | 1.43 | 1.43 | 1.6 | 1.6 | |
| Alkylate | 32.5 | 28.3 | 23.0 | 17.6 | 24.22 | 22.70 | 22.8 | 30.8 | 29.1 |
| Ethylene conversion, percent | 100 | 95 | 92 | 71 | 89 | 83 | 98 | 97 | 92 |
| Yield, gal. alk/lb. $AlCl_3$ | 22.0 | 11.6 | 9.9 | 1.7 | 25 | 25 | 14.2 | 9.1 | 5.6 |

The following table is a summary of data appearing in Table II.

desirably large proportions of ethylene can be obtained, and at which the said large proportions of non-tolerable

TABLE III

*Effect of hydrogen and of acetylene on DIP catalyst life*

| Reactor Feed, wt. percen: | | | | | | | | |
|---|---|---|---|---|---|---|---|---|
| Hydrogen | 0 | 0 | 0 | 0 | 0.64 | 0.28 | 0.26 | 0.45 |
| Acetylene | 0 | 0.05 | 0.08 | 0.30 | 0.03 | 0.13 | 0.22 | 0.45 |
| Ethylene Conversion, percent | 100 | 95 | 92 | 71 | 89 | 98 | 97 | 92 |
| Yield: Gal. Alkylate/lb. $AlCl_3$ | 22.0 | 11.6 | 9.9 | 1.7 | 25 | 14.2 | 9.1 | 5.6 |

The first four columns of Table III show the deleterious effect of acetylene on catalyst life. With no acetylene present in the feed 22.0 gallons of alkylate is produced per pound of $AlCl_3$ catalyst while 0.30 weight percent decreases the yield of alkylate to only 1.7 gallons per acetylene are obtained, there is also obtained a large increase in the proportion of hydrogen which is produced, and (3) the said cracked effluent can be used directly, without any physical or chemical treatment to remove acetylene therefrom, in the presence of an aluminum halide catalyst to alkylate isobutane under conditions to yield diisopropyl.

Thus according to the invention there has been provided a process for the production of diisopropyl from isobutane by its condensation with ethylene contained in a cracked effluent which comprises cracking an ethane-containing gas at a temperature in the range 1475–1900° F. and then alkylating the isobutane with the gaseous effluent of said cracking in the presence of an aluminum halide catalyst under alkylating conditions.

Advantageously the gas, which can contain some propane and butane, is subjected to cracking in a so-called pebble heater which is preeminently suited to the conversion of hydrocarbons at very high temperatures which are ordinarily very hard upon metallic equipment. The design and construction of pebble heaters is shown and described in the art. Patent 2,534,089, issued December 12, 1950, describes and claims a pebble heater. Other patents directed to pebble heaters are also extant.

The conditions in the alkylation step of the process are selected to produce maximum yield and quality of alkylate. The alkylation zone is operated at a temperature in the range 80–150° F. and under a pressure in the range 200 to 500, usually about 300–500 pounds per square inch gage.

The drawing illustrates diagrammatically an embodiment or flow plan according to the invention.

In the drawing ethane enters heater 2 and is cracked at a temperature in the range 1475–1900° F. to yield a cracked gas containing ethylene, acetylene, and hydrogen. The gas is compressed to 400 to 500 p. s. i. g. and substantially freed of butane and heavier hydrocarbons in zone 3. The compressed cracked gas is then charged to reactor 4. Fresh feed and recycle isobutane are also introduced into reactor 4 through pipes 5 and 6 and catalyst, for example a fluid aluminum chloride-hydrocarbon complex, is introduced into reactor 4 through line 7, pump 8, and line 9. Make-up catalyst is added through line 10. The effluent from reactor 4 is passed to settler 12 through line 11 and a catalyst phase settles out from the hydrocarbons in settler 12. Gases which accumulate in settler 12 are taken off through line 13 and treated in a vapor recovery unit, not shown. Some catalyst is withdrawn through line 14 and replaced with make-up catalyst through line 10, as stated. Catalyst which accumulates in settler 12 is returned to reactor 4 via line 7, pump 8 and line 9. Hydrocarbon effluent from settler 12 is passed through line 15 to another settler 16. A portion of the effluent in line 15 is passed through line 17, pump 18; cooler 19 and line 20 to line 5 and thus to reactor 4 to regulate the temperature of the reaction therein. Alternately cooling coils may be installed in reactor 4 to remove part or all of the heat of reaction, thus reducing or eliminating hydrocarbon recirculation. From settler 16 some catalyst which has not settled in settler 12 is passed through line 21 into line 7 for return to the reactor zone. An alkylate-containing stream is taken from settler 16 by way of line 22 to depropanizer 23 wherein $C_3$ and lighter are removed through line 24. Bottoms from the depropanizer 23 are passed through line 25 into dissolutionizer 26 from which an isobutane containing stream is recycled to reactor 4 through line 6, and alkylate is removed through line 28.

It is within the scope of the present invention to vary the feed to the alkylation zone. Thus, the hydrogen concentration usually will be within the range 1 to 20, e. g. from about 4 to about 20 mol percent, based upon fresh feed and recycle isobutane. Hydrogen requirement is increased by low mol ratios of isoparaffin to the olefin or by low operating pressure. Hydrogen can be added from external sources to arrive at any desired hydrogen ratio or hydrogen partial pressure.

The following table shows the compositions of streams in a diisopropyl alkylation according to the invention.

TABLE IV

*Composition of streams in DIP alkylation*

| | | |
|---|---|---|
| Cracking conditions (ethane feed): | | |
| Temp., ° F | 1,500 | 1,600 |
| Pressure, p. s. i. g | 0 | 0 |
| Percent $C_2H_6$ cracked | 73 | 82.5 |
| Composition cracking furnace effluent, mol percent a: | | |
| $H_2$ | 40.6 | 43.5 |
| $CH_4$ | 9.4 | 10.1 |
| $C_2H_2$ | 0.15 | 0.5 |
| $C_2H_4$ | 31.85 | 33.8 |
| $C_2H_6$ | 15.9 | 9.8 |
| $C_3+$ | 2.1 | 2.3 |
| | 100.00 | 100.00 |
| Composition of alkylation reactor feed, mol percent b: | | |
| $H_2$ | 18.02 | 18.70 |
| $CH_4$ | 4.17 | 4.34 |
| $C_2H_2$ | 0.07 | 0.22 |
| $C_2H_4$ | 14.15 | 14.50 |
| $C_2H_6$ | 7.05 | 4.20 |
| $iC_4$ | 56.56 | 58.04 |
| | 100.00 | 100.00 | a Calculated by method given in Ind. Eng. Chem. 41, 2531 (1949), assuming cracking carried to 100% of equilibrium.
b Assuming 4.0 mol external ratio of isobutane to olefin.

Advantages of a process according to this invention are apparent from this disclosure, the drawing and the claims. However, especially noteworthy are the following. Fractionating or chemical treatment equipment including pumps, heating and cooling means, etc., have not been necessary as would have been expected from the prior art view of the ethylene-containing streams of the present invention, to remove non-tolerable proportions of acetylene from the ethylene containing gas stream; the high temperature cracking, since it can be effected advantageously in a pebble heater, possesses advantages of increased daily ethylene and hydrogen yields, the increased acetylene yield having been unexpectedly found to be tolerable when operating according to the concept of the invention, the importance of which will be appreciated all the more when it is considered that each pound of acetylene entering into the alkylation reactor would have been expected to render inactive approximately four pounds of aluminum halide catalyst. It has also been found that, while premature catalyst deterioration will occur in the prior art alkylation reactions, described herein, if more than one mol of propylene to each mol of ethylene is present in the absence of hydrogen, in the presence of hydrogen according to the invention larger proportions of propylene and even other deleterious gases may be present.

Variation and modification are possible within the scope of the foregoing disclosure, drawing and the appended claims to the invention the essence of which is that there has been provided a process for the alkylation of an isoparaffin with an olefin, such as ethylene and/or propylene, in the presence of an aluminum halide catalyst, under alkylation conditions, for example to produce diisopropyl, the said olefin being in a cracked gas stream resulting from the cracking of ethane and/or propane at a temperature in the range 1475–1900° F. to a 60–95 percent conversion at approximately atmospheric pressure, or somewhat higher pressures, up to 20 p. s. i. g., and the said stream being used directly as such, or with added hydrogen, as the case may be, to obtain increased life of catalyst in spite of the greatly increased quantities of acetylene which are present in such a cracked gas.

We claim:

1. A process for the production of diisopropyl from isobutane and ethylene which process comprises cracking a normally gaseous hydrocarbon containing at least two carbon atoms per molecule to form a cracked product comprising hydrogen, ethylene, acetylene, propylene and $C_4$ hydrocarbons, removing butanes and any heavier hydrocarbons from the cracked product, directly utilizing the resulting cracked gas to supply the ethylene in a mixed-phase alkylation of isobutane with ethylene in the presence of an aluminum halide alkylation catalyst under alkylation conditions, and recovering an alkylate containing diisopropyl.

2. A process according to claim 1 wherein the hydrogen content of the cracked gases is adjusted to be in the range of 1 to 20 mol percent based upon the fresh feed including recycled isobutane, to the alkylation.

3. A process according to claim 1 wherein the catalyst is a fluid aluminum chloride hydrocarbon complex alkylation catalyst.

4. An alkylation process according to claim 1 wherein the acetylene in weight percent of the total feed to the alkylation is in excess of 0.03, the alkylation is effected at a temperature in the range 80–150° F., and the pressure is in the range 200–500 pounds per square inch gage.

5. A process for the production of diisopropyl from isobutane and ethylene which process comprises cracking a hydrocarbon selected from the group consisting of ethane and propane, to form a cracked product comprising hydrogen, ethylene, acetylene, propylene and $C_4$ hydrocarbons, removing butanes and any heavier hydrocarbons from the cracked product, directly utilizing the resulting cracked gas to supply the ethylene in a mixed-phase alkylation of isobutane with ethylene in the presence of an aluminum halide alkylation catalyst under alkylation conditions, and recovering an alkylate containing diisopropyl.

6. A process for the production of diisopropyl from isobutane and ethylene which process comprises cracking ethane at a temperature in the range 1475 to 1900° F. to obtain a conversion of ethane in the range 60 to 95 percent at approximately atmospheric pressure, compressing the effluent gas containing hydrogen, ethane, ethylene, acetylene, propylene, and small amounts of butane and butylenes to a pressure in the range 400 to 500 pounds per square inch gauge, removing butanes and heavier hydrocarbons therefrom, directly using the resulting gas to supply the ethylene in a mixed-phase alkylation of isobutane in the presence of an aluminum halide catalyst at a temperature in the range 80 to 150° F. and a pressure in the range 300 to 500 pounds per square inch gauge, and recovering diisopropyl as a product of said alkylation.

7. A process for the production of alkylate from a low-boiling alkylatable isoparaffin and a cracked gas containing substantial proportions of hydrogen and ethylene together with minor proportions of acetylene and $C_3$ and heavier hydrocarbons, which process comprises separating from said cracked gas the hydrocarbons having more than 3 carbon atoms per molecule, directly passing the remaining cracked gas to an alkylation zone wherein said low-boiling alkylatable isoparaffin is alkylated with ethylene in the presence of an aluminum halide alkylation catalyst under alkylation conditions, and recovering a resulting alkylate.

8. A process for the production of diisopropyl alkylate from isobutane and ethylene, which process comprises cracking an ethane-containing gas at a temperature in the range 1475 to 1900° F. and a pressure in the range 0 to 20 p. s. i. g., to obtain a conversion of ethane in the range 60 to 95 percent, the resulting product containing substantial amounts of hydrogen and ethylene together with minor amounts of acetylene and $C_3$ and heavier hydrocarbons, removing hydrocarbons containing more than 3 carbon atoms per molecule from said product, directly utilizing the remaining gas to supply ethylene in an alkylation of isobutane with ethylene in the presence of a fluid aluminum chloride-hydrocarbon complex catalyst which catalyzes said alkylation, said alkylation being conducted at a temperature in the range 80 to 150° F. and a pressure in the range 200 to 500 p. s. i. g., and recovering an alkylate containing diisopropyl.

9. A process according to claim 8 wherein the acetylene content of the total hydrocarbon feed to the alkylation is greater than 0.03 weight percent and the hydrogen content of said feed is in the range 1 to 20 mol percent.

10. A process for the production of diisopropyl from isobutane and ethylene which process comprises pyrolyzing an ethane-containing gas at a temperature in the range 1500 to 1600° F. and approximately atmospheric pressure to obtain an ethane conversion in the range 73 to 82.5 percent, whereby a product is produced which contains ethylene and hydrogen together with minor proportions of acetylene, propylene and hydrocarbons having more than 3 carbon atoms per molecule, separating from said product said hydrocarbons having more than 3 carbon atoms per molecule, passing directly the remaining gas, together with isobutane, to a mixed-phase alkylation of said isobutane with said ethylene in the presence of a fluid aluminum chloride-hydrocarbon complex catalyst at a temperature in the range 80 to 150° F. and a pressure in the range 300 to 500 p. s. i. g., and recovering a diisopropyl-containing alkylate.

11. In a process in which a low-boiling isoparaffin is alkylated, in the presence of an aluminum halide alkylation catalyst under conditions which promote alkylation with ethylene as the main alkylation reaction, with which is accompanied by acetylene as an impurity, the improvement which comprises conducting the alkylation in the presence of a substantial amount of hydrogen and thus counteracting the deleterious effect of the acetylene on the catalyst.

References Cited in the file of this patent

UNITED STATES PATENTS

| | | |
|---|---|---|
| 2,196,831 | Hull et al. | Apr. 9, 1940 |
| 2,233,363 | Frey et al. | Feb. 25, 1941 |
| 2,296,511 | Frey et al. | Sept. 22, 1942 |
| 2,298,383 | Ipatieff et al. | Oct. 13, 1942 |
| 2,312,539 | Frey | Mar. 2, 1943 |
| 2,382,117 | Warrick | Aug. 14, 1945 |
| 2,696,511 | Bailey et al. | Dec. 7, 1954 |

OTHER REFERENCES

"Reaction of Pure Hydrocarbons" (Egloff), Reinhold Publishing Corp., N. Y. (1937), (pages 111–112 relied on).

Alden et al.: "The Story of Diisopropyl," Oil and Gas Journal, volume 44, February 9, 1946, page 103, column 1.